US010003602B2

(12) United States Patent
Hockings et al.

(10) Patent No.: US 10,003,602 B2
(45) Date of Patent: Jun. 19, 2018

(54) DETERMINING EMAIL AUTHENTICITY

(71) Applicant: International Business Machines Corporation, Armonk, NY (US)

(72) Inventors: Christopher J. Hockings, Burleigh Waters (AU); Neil I. Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 14/312,852

(22) Filed: Jun. 24, 2014

(65) Prior Publication Data

US 2015/0373031 A1    Dec. 24, 2015

(51) Int. Cl.
*H04L 29/06* (2006.01)
*H04L 29/08* (2006.01)
*H04L 12/58* (2006.01)

(52) U.S. Cl.
CPC ............ *H04L 63/123* (2013.01); *H04L 51/12* (2013.01); *H04L 63/0227* (2013.01); *H04L 67/22* (2013.01); *H04L 51/34* (2013.01)

(58) Field of Classification Search
None
See application file for complete search history.

(56) References Cited

U.S. PATENT DOCUMENTS

| | | | |
|---|---|---|---|
| 6,212,265 B1 * | 4/2001 | Duphorne | H04L 51/24 379/100.08 |
| 6,745,230 B1 * | 6/2004 | Cao | G06Q 10/107 379/88.12 |
| 7,130,850 B2 | 10/2006 | Russell-Falla et al. | |
| 7,421,498 B2 | 9/2008 | Packer | |
| 7,536,442 B2 | 5/2009 | Kelley et al. | |
| 7,546,349 B1 * | 6/2009 | Cooley | G06Q 10/107 709/206 |
| 8,095,602 B1 * | 1/2012 | Orbach | G06Q 10/107 709/206 |
| 8,504,623 B2 * | 8/2013 | Santos | G06Q 10/107 707/705 |
| 9,253,663 B2 * | 2/2016 | Raleigh | H04W 24/02 |
| 2005/0015626 A1 * | 1/2005 | Chasin | H04L 63/0245 726/4 |
| 2006/0129644 A1 | 6/2006 | Owen et al. | |
| 2006/0149823 A1 * | 7/2006 | Owen | G06Q 10/107 709/206 |
| 2007/0033258 A1 * | 2/2007 | Vasilaky | H04L 51/12 709/206 |
| 2007/0271343 A1 * | 11/2007 | George | H04L 51/34 709/206 |

(Continued)

OTHER PUBLICATIONS

Castillo et al., An Interactive Hybird System for Identifying and Filtering Unsolicited Email, © 2005, IEEE, 2 pages.*

(Continued)

*Primary Examiner* — Jeffrey C Pwu
*Assistant Examiner* — Baotram Tran
(74) *Attorney, Agent, or Firm* — Stephen R. Yoder

(57) ABSTRACT

Monitoring across multiple-channels, used by multiple devices, to determine which email messages being sent to a user are solicited by the user. A broad spectrum of network and telephony access records are analyzed to determine whether an email message is likely being sent as a result of legitimate services access by the user.

20 Claims, 5 Drawing Sheets

(56) References Cited

U.S. PATENT DOCUMENTS

| | | | |
|---|---|---|---|
| 2008/0046579 A1* | 2/2008 | Walton | H04L 51/12 709/229 |
| 2008/0320183 A1* | 12/2008 | Fyock | G06F 17/30592 710/52 |
| 2009/0157693 A1* | 6/2009 | Palahnuk | G06Q 30/00 |
| 2009/0192881 A1* | 7/2009 | Pierre | G06Q 10/107 705/59 |
| 2009/0234865 A1* | 9/2009 | Gillum | G06Q 10/107 |
| 2009/0300012 A1* | 12/2009 | Levow | H04L 51/12 |
| 2010/0017360 A1* | 1/2010 | Bansal | H04L 51/12 707/E17.044 |
| 2010/0064013 A1* | 3/2010 | Aranzulla | H04L 43/00 709/206 |
| 2010/0161537 A1* | 6/2010 | Liu | H04L 41/142 706/46 |
| 2011/0178897 A1* | 7/2011 | Balasubramanian | G06Q 20/12 705/27.1 |
| 2012/0010995 A1* | 1/2012 | Skirpa | G06F 3/0481 705/14.49 |
| 2012/0089845 A1* | 4/2012 | Raleigh | H04L 12/14 713/176 |
| 2012/0303439 A1 | 11/2012 | Flitcroft et al. | |
| 2013/0304576 A1* | 11/2013 | Berland | G06Q 50/01 705/14.53 |
| 2014/0058815 A1* | 2/2014 | Hiremath | G06Q 30/0215 705/14.17 |
| 2014/0214668 A1* | 7/2014 | Lotter | H04L 63/20 705/41 |
| 2014/0331119 A1* | 11/2014 | Dixon | H04L 63/168 715/234 |
| 2015/0067833 A1 | 3/2015 | Verma et al. | |

OTHER PUBLICATIONS

Hidalgo et al., Content Based SMS Spam Filtering, © 2006, ACM, 8 pages.*

Guillaume, Next Generation Mail: Toward a Personal Social CRM, © 2011, IEEE, 3 pages.*

Jayanthi et al., Personalized Query Expansion based on Phrases Semantic Similarity, © 2011, IEEE, 5 pages.*

Loia et al., Similarity-based Agents for Email Mining, © 2001, IEEE, 6 pages.*

Price, Protecting Privacy Credentials from Phishing and Spyware Attacks, © 2007, IEEE, 8 pages.*

Solanas et al., Privacy in the Information and Communications Technologies, © 2007, IEEE, 6 pages.*

Li et al., Email Archive Analyis Through Graphical Visualization, © 2004, ACM, 5 pages.*

IBM, "Building a Spam Corpus Automatically", IP.com Prior Art Dabase Technical Disclosure, Original Publication Date: Sep. 10, 2003, IPCOM000019303D, IP.com Electronic Publication: Sep. 10, 2003.

* cited by examiner

DETERMINING EMAIL AUTHENTICITY

FIELD OF THE INVENTION

The present invention relates generally to the field of electronic messaging and more particularly to determining email authenticity.

BACKGROUND OF THE INVENTION

Many consumers choose to use the email service provided by their internet service providers (ISPs). The ISPs could provide one or more internet services to the consumer, including asymmetrical digital subscriber line (ADSL), cable, mobile, 3G, and/or long-term evolution (LTE). The customer's choice is often driven by: (i) convenience; (ii) ignorance of the ISP type (e.g., cloud email services); (iii) trust in the customer's ISP; and/or (iv) lack of trust of cloud-based service providers. ISPs may also provide additional security controls that protect the end users from external unsolicited bulk messages (SPAM) or viruses.

State of the art email services provide automatic filtering services with the objective of improved usability for registered users. Filtering may depend on rules or heuristics based on the content of the email body, content of header(s), and/or reputation metrics.

SUMMARY

Embodiments of the present invention disclose a method, computer program product, and system for determining email authenticity. A first computer system monitoring access by a user to a plurality of internet-based services. The first computer system storing a service access dataset for the user. The first computer system receiving an email dataset from an email service that includes a uniform resource locator (URL). The first computer system determining a correlation between the email dataset and the service access dataset.

DETAILED DESCRIPTION

Figure 1:
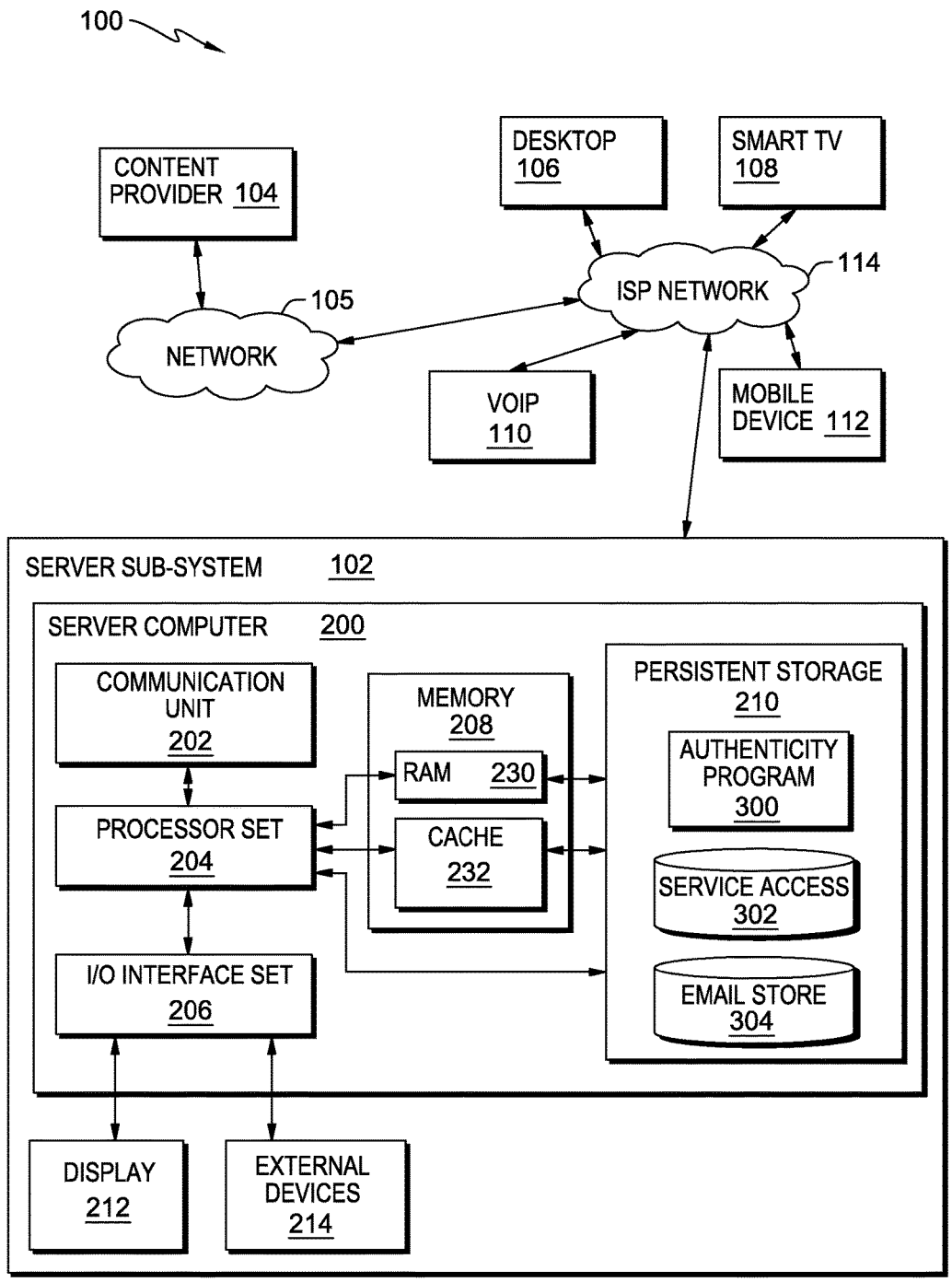
FIG. 1 is a schematic view of a first embodiment of a system according to the present invention.

The present invention monitors multiple-channels, used by multiple devices, to determine which email messages being sent to a user are solicited by the user. A broad spectrum of network and telephony access records are analyzed to determine whether an email message is likely being sent as a result of legitimate services access by the user. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: server sub-system 102; content provider sub-system 104; desktop sub-system 106; smart tv sub-system 108; voice-over-internet protocol (VoIP) sub-system 110; mobile device sub-system 112; ISP network 114; network 105; server computer 200; communication unit 202; processor set 204; input/output (I/O) interface set 206; memory device 208; persistent storage device 210; display device 212; external device set 214; random access memory (RAM) devices 230; cache memory device 232; service access history 302; email store 304; and authenticity program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Program 300 operates to monitor user network activities across multiple channels (e.g., ADSL, cable, and/or mobile/3G/LTE) via multiple devices (e.g., personal computers, tablets, VOIP, smart TV, and/or smart phones), such as destination addresses (IP/ports) as well as application level resources (e.g., web uniform resource locators (URLs)), for determining email authenticity.

Some embodiments of the present invention recognize the following facts, potential problems and/or potential areas for improvement with respect to the current state of the art: (i) some well-constructed phishing attacks may not be correctly detected by classification approaches as they exist conventionally; (ii) phishing attacks may encourage consumers with limited security awareness or expertise to read and act upon SPAM or phishing mail; (iii) malware injected into a user's browser while browsing a social media site could generate a phishing email to the user to coax the user into clicking on a fake email prompting the user to "reset my social media account password;" (iii) in cases where internet connectivity and email services are being provided by the same ISP or a same commercial entity, what is needed is an improved capability to correctly classify email messages; (iv) one channel and one device is a simple conventional implementation in effect; (v) multiple devices and single channel is more complex, as a solution is needed to perform user activity monitoring across a single data set (e.g., email); (vi) multiple devices on multiple channels increases the complexity even further by introducing a requirement to monitor more than one data set source and correlate these events at speed; (vii) integration with a subscription registry increases the complexity of any solution; and/or (viii) a compelling reason to provide consumer protection is increasing due to the fact that individuals are typically using multiple devices bound to single ISPs.

Some embodiments of the present invention provide in-line correlation of received emails and stored access history data originating from multiple channels, and accessed by multiple user devices, occurring over a period of time. In this embodiment, a user-centric security information and event monitoring solution is employed. This solution integrates into numerous enforcement points, such that knowledge of a set of technologies (associated with the various enforcement points, such as email, voice over internet protocol, and wireless communication) is used.

Some embodiments of the present invention attempt to identify causal relationships between a consumer's recent internet usage and legitimate emails received from other service providers, providing an improved classification technique for incoming mail messages. Some embodiments of the present invention focuses on a broad spectrum of network and telephony access records to determine whether an email is likely to be sent as a result of legitimate access.

Some embodiments of the present invention provide for a user with network devices to access services through a single ISP, such that the ISP hosts both email services and network services. A user may access these services over multiple channels, such as ADSL, cable, mobile, nG, and/or LTE, using multiple personal computing devices including, but not limited to: personal computers, tablets, and/or smart phones.

Some embodiments of the present invention monitor network access, including domain name system (DNS), hypertext transfer protocol (HTTP), and/or any protocols used by clients to access the network. In some embodiments of the present invention, the destination address (IP/ports) is monitored as well as any application level resources (e.g., web URLs). An existing device, such as a next generation firewall that can perform secure sockets layer (SSL) inspection, would be required in order to inspect encrypted traffic. In such cases, a user would be expected to opt in to such inspection.

Figure 2:
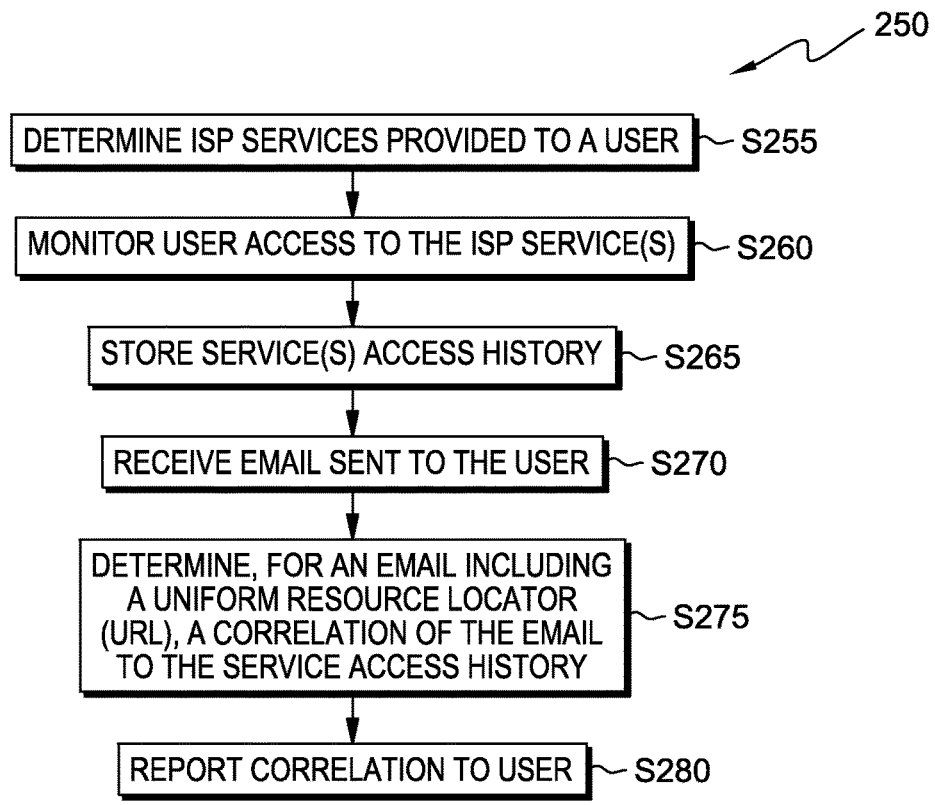
FIG. 2 is a flowchart showing a method performed, at least in part, by the first embodiment system.
Figure 3:
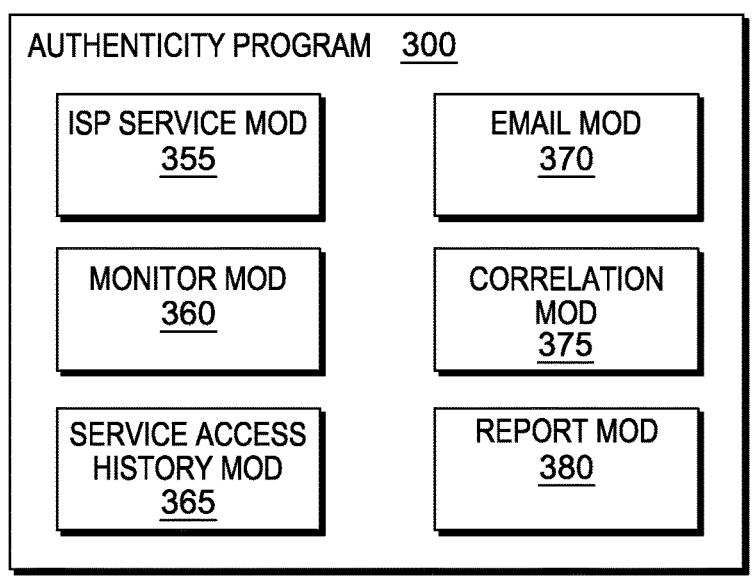
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where ISP services module 355 determines one, or more, ISP services provided to a user. The user uses the services the ISP provides through ISP network 114 (FIG. 1) to access content providers deployed on network 105 (FIG. 1). The services provided include: (i) ADSL; (ii) cable; (iii) mobile; (iv) 3G; and/or (v) LTE. The user may use multiple devices including, but not limited to: (i) desktop; (ii) smart TV; (iii) VOIP; and/or (iv) smart phone. In some embodiments, as discussed in more detail below, the service(s) provided to the user are registered with the ISP and stored in a subscribed service registry.

Processing proceeds to step S260, where monitor module 360 monitors user access to the ISP service(s). Monitor module 360 monitors the user's access activities including, but not limited to: (i) the type of device the user uses; (ii) the service type provided by the ISP to the user; (iii) the website name the user visits; and/or (iv) the IP address of the website visited by the user.

Processing proceeds to step S265, where service access history module 365 stores service(s) used by the user to generate the user access history. The user's access activities monitored in step S260 are stored, in this example, in service access history, or aggregated services store 302, in which a user's access history entry is generated. In some embodiments, a user's service access is parsed and/or categorized during the storing process. In this example, the subscribed service registry is further integrated such that the user access entry includes one, or more, of the following pieces of information: (i) the user's account name used to subscribe the ISP service; (ii) which channel is used to access a content provider; (iii) what time the channel is used; (iv) how long the channel is used; (v) which content provider the user visits; and/or (vi) what protocols the user uses. Further, in this example, user access history in stored for six months. Alternatively, access history data is stored for a longer, or shorter, period of time according to, for example, corporate policy or individual preference.

Processing proceeds to step S270, where email module 370 receives emails sent to the user by, for example, a content provider over network 105 and ISP network 114. In this example, email communications sent to the user, and corresponding email information, are stored for an extended period of time, such as 24 hours, in email store 304 to ensure that each email is well analyzed prior to authentication. This embodiment is used where authenticity is highly regarded such that delayed email receipt is tolerated. Alternatively, the emails sent to the user are stored temporarily, along with other email information, in an email store managed by the ISP for prompt authentication. The stored information about the email may include: (i) the email metadata; (ii) the email address; (iii) the email content; and/or (iv) one or more URL links.

Processing proceeds to step S275, where correlation module 375 determines, for an email including a uniform resource locator (URL), a correlation of the email to the service access history. The stored email information is cross-checked with the user's access history entries including entries such as the monitored access activities by the user. Examples include: (i) check to see whether or not the email is delivered by the content provider previously visited by the user; and/or (ii) the URL link contained in the email has a same DNS.

Processing ends at step S280, where report module 380 reports the correlation, if any, as determined in step S275. The email analyzed in step S275 is classified according to the analysis outcome so that the classification adequately reflects the risk presented by the email. For example, an email can be designated as a "5" on a scale of 1 to 5, where a higher score indicates increased relevance of the email to the user's network access history. Alternatively, the email may be flagged with a designated color according to the likelihood of its authenticity.

Some embodiments of the present invention integrate a subscribed service registry, which is a repository that is aware of the different services the consumer has subscribed to from this internet service provider. Subscribed services, as used herein, does not refer only to paid services, but to any services that are available to a user through the ISP. The subscribed services may include, but are not limited to: ADSL, cable, mobile, 3G, and/or home telephony.

Some embodiments of the present invention monitor a user's network usage information for each channel. A user access record is generated based on the monitored activity. The user access record is stored in an access repository that is, in some embodiments, a central service. The access repository provides interfaces, such as RESTful (representational state transfer) interfaces to read/write this data. The access repository has access to the subscribed service registry for binding access data from the different ISP channels to individual customer's user access records. It is expected that the access repository store provides access information, for example, using a time sliding window. This is due to the fact that, in most cases, once a user initiates a network operation resulting in an email, the email is delivered to an email repository within a short period of time. This reduces the data storage requirements and also limits the amount of information that is persistent, alleviating a user's concerns about privacy.

The above mentioned email repository is an existing storage of mail delivered to the end user by an email service. The email service has an existing capability to provide a user with access to a user's electronic mail via applications such as a browser, or other applications installed on a mobile device.

The access repository stores user access records generated by the network services that may use audit data collection patterns well known within industry security information and event monitoring (STEM) solutions. Entries within the user access record need only be stored for a very short period of time, for example, enough for an email to be sent and subsequently received. In this example, the time period is of the order ranging from about 2 minutes to about 5 minutes. Some embodiments of the present invention provide for a configurable time period that may be on a per-user basis or a group/organizational basis. The access repository provides a service interface to be used by the email service for assessing individual mail (e.g., through a web service).

Figure 4:
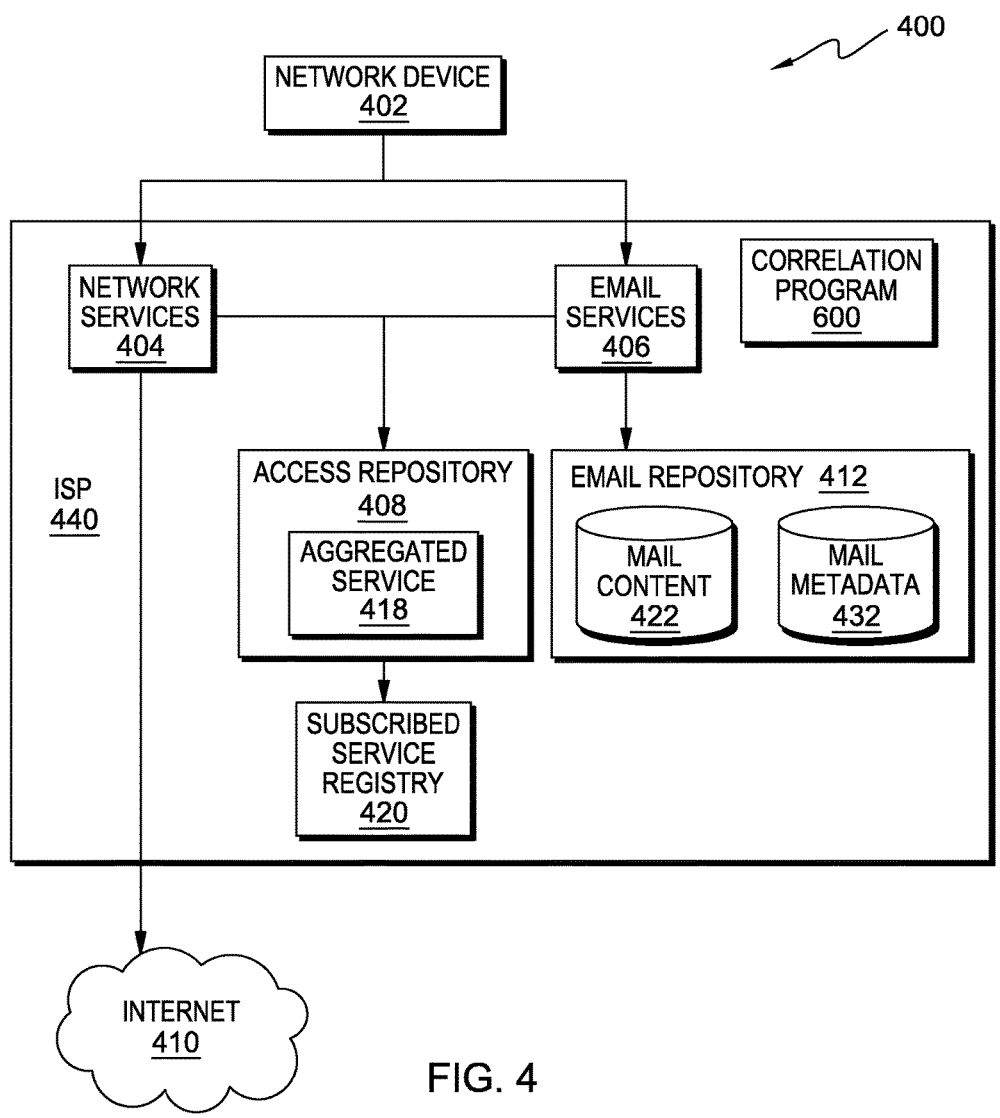
FIG. 4 is a schematic view of a second embodiment of a system according to the present invention.

The present invention will now be described in detail with reference to the Figures. FIG. 4 is a functional block diagram illustrating various portions of networked computers system 400, in accordance with one embodiment of the present invention, including: network device sub-system 402; ISP sub-system 440; network services 404; email service 406; access repository 408; email repository 412; aggregated services 418; subscribed service registry 420; mail content 422; mail metadata 432; internet 410; and correlation program 600.

A user with network device 402 is capable of communicating with ISP sub-system 440 via multiple channels (e.g., ADSL, cable, nG) provided by the user's ISP.

Internet 410 is a source of incoming email messages and/or web servers that provide contents to clients, for example, user(s) with network device 402, over ISP sub-system 440.

Figure 5:
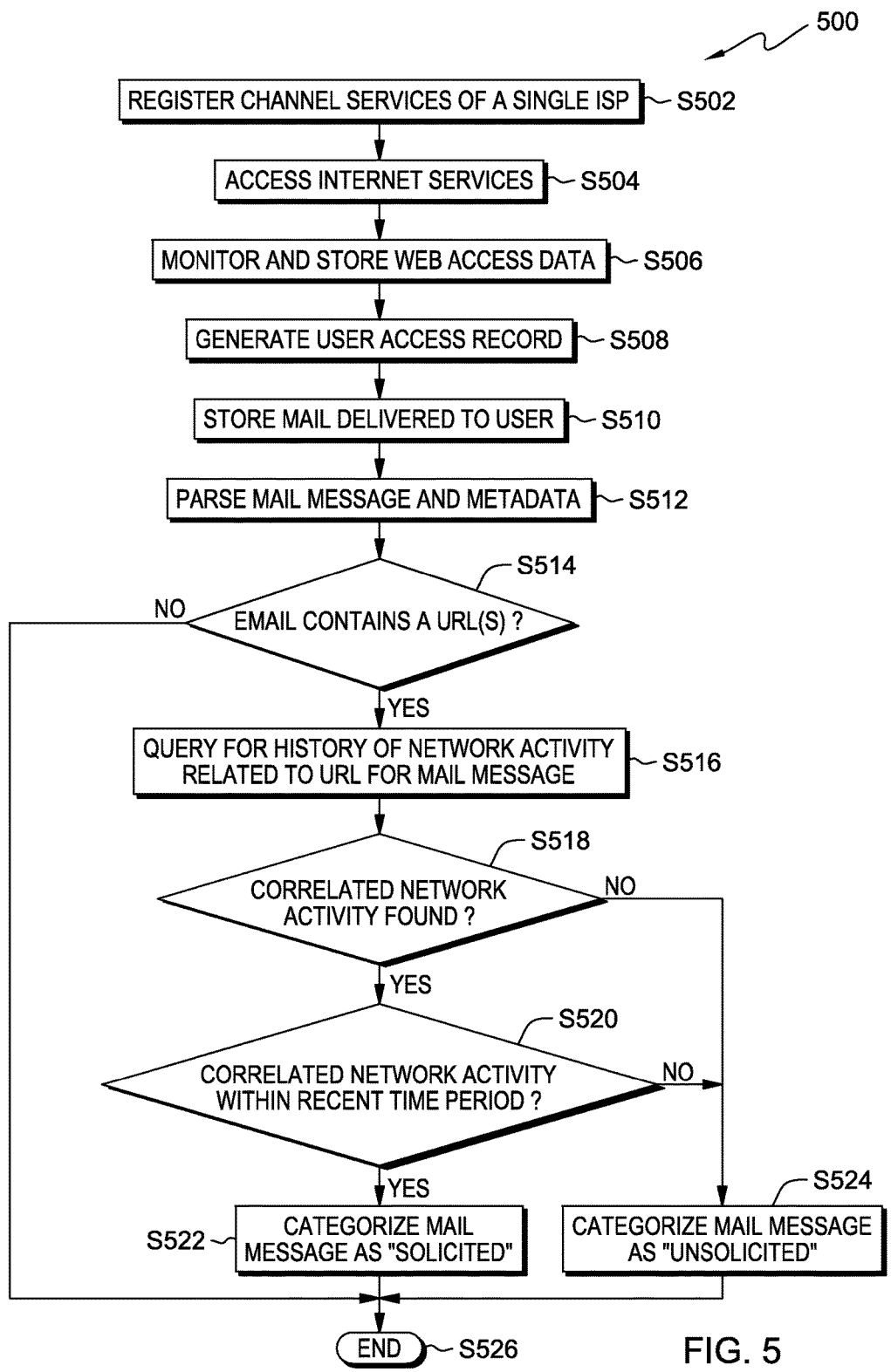
FIG. 5 is a flowchart showing a method performed, at least in part, by the second embodiment system.
Figure 6:
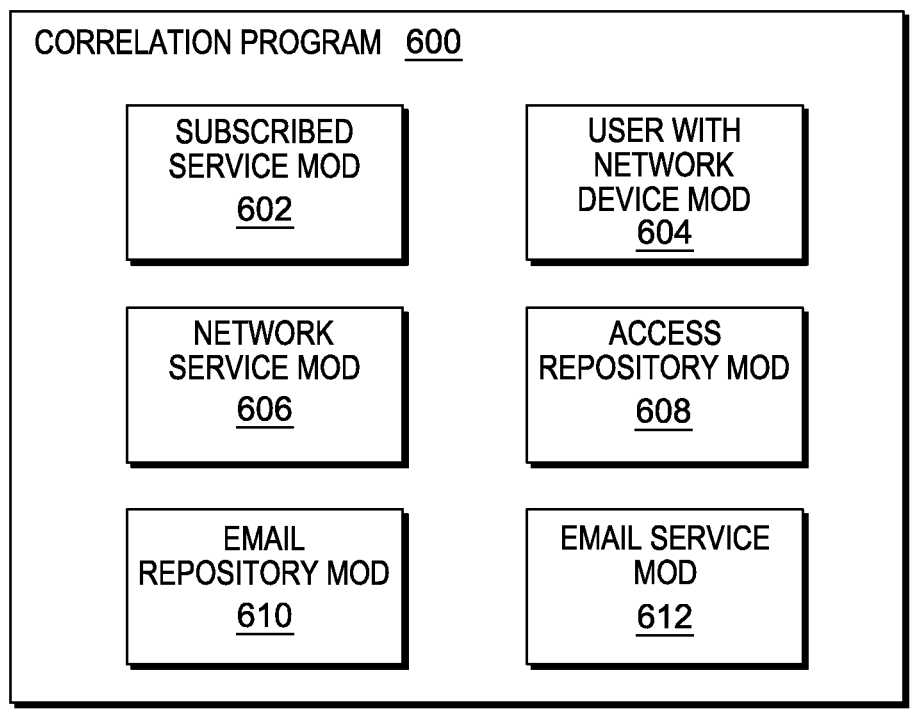
FIG. 6 is a schematic view of a machine logic (for example, software) portion of the second embodiment system.

FIG. 5 shows flowchart 500 depicting a second method according to the present invention. FIG. 6 shows program 600 for performing at least some of the method steps of flowchart 500. This method and associated software will now be discussed, over the course of the following paragraphs, with extensive reference to FIG. 5 (for the method step blocks) and FIG. 6 (for the software blocks).

Processing begins at step S502, where subscribed service module 602 registers and is aware of the different channel services a user(s) subscribes to from an internet service provider (ISP) including, but not limited to: ADSL, cable, mobile, nG, and/or home telephony.

Processing proceeds to step S504, where network device module 604 manages a user having multiple computing devices accessing internet services via multiple channels through the single ISP. In this example, the ISP hosts both email services and network services.

Processing proceeds to step S506, where network service module 606 monitors the user's network access activities across multiple client computing devices and network channels. The network service module further stores the historical web access data for each channel in an access repository, to generate user access records. Historical web access data may include one, or more, of the following: (i) network devices the user uses; (ii) channels the user uses; (iii) DNS, HTTP and any protocols used by the user to access the network; (iv) destination addresses (IP/ports); (v) application level resources (e.g. web URLs); (vi) firewall; (vii) secure sockets layer (SSL); and/or (vii) encrypted traffic.

Processing proceeds to step S508, where access repository module 608 accesses the subscribed service registry, to bind the historical access data from the different ISP channels to the user's user access records.

Processing proceeds to step S510, where email repository module 610 stores email messages coming from internet sources delivered to the user(s) by the email services of the ISP.

Processing proceeds to step S512, where email service module 612 analyzes incoming email metadata and content to determine if a URL(s) is contained in the email message.

Processing proceeds to step S514, where email service module 612 determines if the incoming email contains a URL(s). If "No", processing proceeds to step S526 to continue processing the mail message. If "Yes", processing proceeds to step S516. While much of the discussion focuses on embedded URLs, additional embedded information such as phone numbers, email addresses, and other links in an email message may be applicable.

Processing proceeds to step S516, where email service module 612 queries the access repository, through a service interface, for history of network activities related to the URL(s) for mail message(s). The stored access activities by the user, monitored by the ISP, are extracted from the user access record. The email service module cross-checks the web access data in the access repository and the email content to determine if the email is the result of the user's access. In this example, the "related activities" can be defined by, for example, the same top-level DNS domain, configured relationships on a per-service-provider basis (e.g., web URL for activating a forgotten password flow is X, the URL in the email message looks like regexp Y).

Processing proceeds to step S518, where email service module 612 determines if the URL(s) in the email message(s) correlate or relate to network activities found in the access repository. Here "correlate or relate to" is as defined for "related activities" in step S516. The email information including metadata and content is analyzed and cross-checked with the user's access record, including all access activities by the user monitored by the ISP, for example, whether or not the email is sent by the website previously visited by the user. If "No," processing proceeds to step S524 where email service module 612 categorizes the email message as "unsolicited." If "Yes," processing proceeds to step S520.

Processing proceeds to step S520, where email service module 612 determines if the URL(s) correlated network activities are performed within a recent time period. In this example, the time period is 4 weeks. Alternatively, the time period over which the network activities are considered for an incoming email is a matter of corporate policy. Alternatively, the time period is pre-defined by a system architect. Alternatively, the time period is tunable, or dynamic, based on the classification of the communication type, e.g., telephone, internet. For example, if recent telephone calls were made to a bank, then this audit data may be reliable for holding for a significant period of time. It may be used for assessing communication authenticity in the future. In this example, there is a lot more at stake (financial matters) than other interactions, such as with the local taxi company, or similar services. If "No," processing proceeds to step S524 where email service module 612 categorizes the mail message as "unsolicited." If "Yes," processing proceeds to step S522.

Processing proceeds to step S522, where email service module 612 categorizes the mail message as "solicited." Here "solicited" indicates the email is the legitimate outcome of the user's previous access activities through the ISP. For example, a URL link contained in an email asking for the user's further action is asserted to be authentic, so the user can proceed to follow the instruction described in the email body. Based on the analysis outcome, the "solicited" email may be assigned to a particular shaped icon to indicate the user. Alternatively, the "solicited" email may be placed in a designated email folder.

Processing ends at step S526.

Some embodiments of the present invention may include one, or more, of the following features, characteristics and/or advantages: (i) uses historical internet usage as an new input to assess received email for authenticity; (ii) illegitimate emails, such as those used in a phishing attack, will stand out more clearly from their authentic counterparts; (iii) provides visual feedback to the end user of the risk presented by an email, e.g., through appropriate color coding of categories; (iv) enhances the value proposition of internet service providers since they have visibility across multiple network channels used by the user; (v) ability to implement this invention without having to alter how email messages are initially created or sent; (vi) compliments existing email spam detection techniques by detecting unsolicited but suspicious email messages; and/or (vii) improved capability to protect consumers where consumers could use multiple devices (e.g., personal computer, tablet, smart phone) through multiple channels (e.g., ADSL, cable, mobile/nG).

While described above in the context of an ISP and consumers who are members of the public, in some embodiments, this invention can be adapted to an enterprise scenario where the email service and the internet connectivity is provided by the enterprise. Some embodiments of the present invention are implemented by a single-user version running on a user's computing device. In such cases, network activity may be limited to a single client computer device, as opposed to multiple devices.

What is claimed is:

1. A method comprising:
   monitoring, by an internet service provider (ISP), service access by a user from a first device and a second device for interaction data between the user and a plurality of internet-based services;
   storing a service access dataset for the user, the service access dataset including the interaction data of the first device including a first destination internet protocol (IP) address and a first uniform resource locator (URL) and of the second device including a second destination IP address and a second URL;

receiving, by the ISP, an email dataset addressed to the user, the email dataset including an email message and at least a sending device IP address or an embedded URL;
responsive to the email dataset including the embedded URL, determining a correlation between the embedded URL of the email dataset and the data of the service access dataset, wherein determining the correlation includes:
identifying email information in the email dataset; and
comparing the email information with the data of the service access dataset; and
modifying, before transmission by the ISP to the user, the email message with an indication of the correlation between the embedded URL and the data of the service access dataset.

2. The method of claim 1, further comprising:
determining the plurality of internet-based services provided to the user.

3. The method of claim 1, wherein the service access dataset further includes a content provider visited by the user.

4. The method of claim 3, wherein the correlation is determined to be high when the email message is delivered by the content provider identified in the service access dataset.

5. The method of claim 1, wherein the email information includes email metadata, an email address, and email message content.

6. The method of claim 1, wherein the data of the service access dataset includes:
(i) network access records;
(ii) telephony access records; and
(iii) recent internet usage.

7. The method of claim 1, wherein:
the plurality of internet-based services are registered with the ISP as being subscribed to by the user; and
a registration record of the internet-based services is stored in a subscriptions services registry.

8. A computer program product comprising a non-transitory computer readable storage medium having stored thereon:
first program instructions programmed to monitor, by an internet service provider (ISP), service access by a user from a first device and a second device for interaction data between the user and a plurality of internet-based services;
second program instructions programmed to store a service access dataset for the user, the service access dataset including the interaction data of the first device including a first destination internet protocol (IP) address and a first uniform resource locator (URL) and of the second device including a second destination IP address and a second URL;
third program instructions programmed to receive, the ISP, an email dataset addressed to the user, the email dataset including an email message and at least a sending device IP address or an embedded URL;
fourth program instructions programmed to, responsive to the email dataset including the embedded URL, determine a correlation between the embedded URL of the email dataset and the data of the service access dataset, wherein determining the correlation includes:
identifying email information in the email dataset; and
comparing the email information with the data of the service access dataset; and
fifth program instructions programmed to modify, before transmission by the ISP to the user, the email message with an indication of the correlation between the embedded URL and the data of the service access dataset.

9. The computer program product of claim 8, further comprising:
sixth program instructions programmed to determine the plurality of internet-based services provided to the user.

10. The computer program product of claim 8, wherein the service access dataset further includes a content provider visited by the user.

11. The computer program product of claim 10, wherein the correlation is determined to be high when the email message is delivered by the content provider identified in the service access dataset.

12. The computer program product of claim 8, wherein the email information includes email metadata, an email address, and email message content.

13. The computer program product of claim 8, wherein the data of the service access dataset includes:
(i) network access records;
(ii) telephony access records; and
(iii) recent internet usage.

14. The computer program product of claim 8, wherein:
the plurality of internet-based services are registered with the ISP as being subscribed to by the user; and
a registration record of the internet-based services is stored in a subscriptions services registry.

15. A computer system comprising:
a processor(s) set; and
a non-transitory computer readable storage medium;
wherein:
the processor set is structured, located, connected, or programmed to run program instructions stored on the non-transitory computer readable storage medium; and
the program instructions include:
first program instructions programmed to monitor, by an internet service provider (ISP), service access by a user from a first device and a second device for interaction data between the user and a plurality of internet-based services;
second program instructions programmed to store a service access dataset for the user, the service access dataset including the interaction data of the first device including a first destination internet protocol (IP) address and a first uniform resource locator (URL) and of the second device including a second destination IP address and a second URL;
third program instructions programmed to receive, by the ISP, an email dataset addressed to the user, the email dataset including an email message and at least a sending device IP address or an embedded URL;
fourth program instructions programmed to, responsive to the email dataset including the embedded URL, determine a correlation between the embedded URL of the email dataset and the data of the service access dataset, wherein determining the correlation includes:
identifying email information in the email dataset; and
comparing the email information with the data of the service access dataset; and
fifth program instructions programmed to modify, before transmission by the ISP to the user, the email message with an indication of the correlation between the embedded URL and the data of the service access dataset.

16. The computer system of claim 15, further comprising:
sixth program instructions programmed to determine the plurality of internet-based services provided to the user.

17. The computer system of claim 15, wherein the service access dataset further includes a content provider visited by the user.

18. The computer system of claim 17, wherein the correlation is determined to be high when the email message is delivered by the content provider identified in the service access dataset.

19. The computer system of claim 15, wherein the email information includes email metadata, an email address, and email message content.

20. The computer system of claim 15, wherein the data of the service access dataset includes:
   (i) network access records;
   (ii) telephony access records; and
   (iii) recent internet usage.

* * * * *